No. 882,000. PATENTED MAR. 17, 1908.
N. ETTING.
CUPOLA.
APPLICATION FILED SEPT. 24, 1907.

WITNESSES:
Robt R Kitchel
Frank C French

INVENTOR
Newbold Etting
BY
Augustus B. Stoughton
ATTORNEY.

UNITED STATES PATENT OFFICE.

NEWBOLD ETTING, OF PHILADELPHIA, PENNSYLVANIA.

CUPOLA.

No. 882,000.

Specification of Letters Patent.

Patented March 17, 1908.

Application filed September 24, 1907. Serial No. 394,317.

*To all whom it may concern:*

Be it known that I, NEWBOLD ETTING, a citizen of the United States, residing at the city of Philadelphia, in the county of Philadelphia and State of Pennsylvania, have invented certain new and useful Improvements in Cupolas, of which the following is a specification.

The principal objects of the present invention are, first, to prevent the metal which may accidentally overflow from the cupola through the safety twyers from accumulating in the wind box and to insure the delivery of such metal through appropriate openings in the wind box or its retention in suitable safety twyer boxes from or with which it can be readily removed; and second, to provide an efficient and reliable cover for carrying or supporting the fusible or destructible closure for the wind box safety opening in such a way that the opening is normally tightly closed and in such a way that access can be had for removing metal which may be caught by the safety twyer box or for removing the latter together with metal that may adhere to it.

Figure 1:
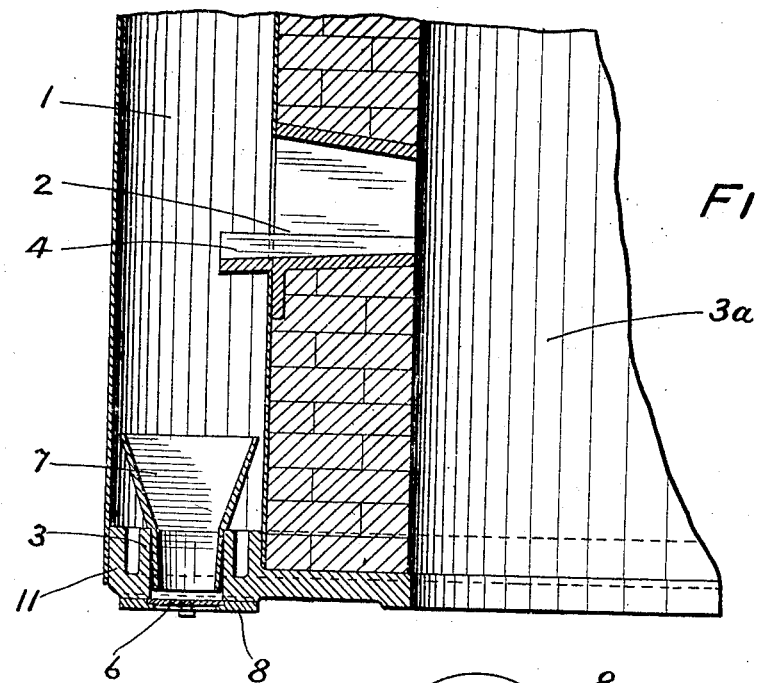
Figure 2:
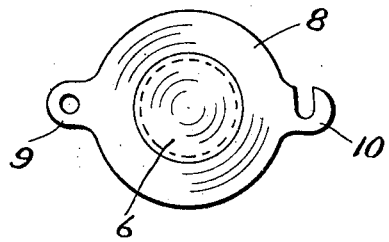
Figure 3:
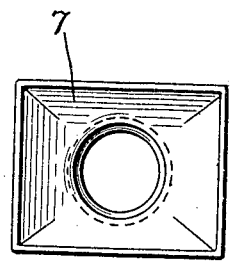
Figure 4:
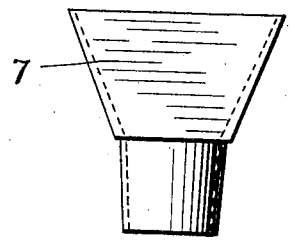

In the drawings, Figure 1, is a sectional view illustrating so much of one-half of a cupola as is necessary for showing the application of the present invention. Fig. 2, is a plan view of the swinging ring shown in Fig. 1, and Figs. 3 and 4, are respectively a plan and a side view of the safety twyer box shown in Fig. 1.

In the drawings 1, is a cupola wind box having a safety twyer 2, and a circular safety outlet 3. These are the usual provisions of a cupola, and if metal should overflow from the interior 3ᵃ, of the cupola stack by way of the safety twyer 2, the gutter 4, is intended to discharge the metal through the circular opening 3, but it frequently happens that this does not occur and that the overflowing metal is deposited in the wind box which produces well understood serious results.

6, is a fusible or destructible plate which is commonly used for normally closing the outlet opening 3, so as to make the wind box tight and which is intended to be destroyed by overflowing metal to permit of the escape of the latter.

7, is a funnel-like box having its smaller cylindrical end arranged in the wall of the safety outlet 3, and having its other oblong end arranged beneath the safety twyer 2, to catch metal accidentally discharged from the safety twyer. The metal so caught in the safety twyer box 7, either escapes therefrom to the outside of the cupola by destroying the plate 6, or solidifies in the box. In either event the metal does not reach the floor of the wind box, so that the latter is uninjured.

8, is a swinging ring provided with lugs 9 and 10. The lug 9, receives a pivot projecting downward from a face formed on the ring 11, and the lug 10, is provided with a hook that engages a screw projecting downward from the face on the ring 11, thus there is provided a tight joint and by swinging the ring 8, access can be readily had to the interior of the safety twyer box 7, for example, for removing any metal that may have collected or set in it as by means of a bar or the like. The safety twyer box 7, may advantageously be made of cast iron so that if it should be filled with metal it can be readily replaced at a small cost.

What I claim is:

1. A cupola wind box having a safety twyer and a safety outlet arranged through its floor and provided with a funnel like box extending above the floor of the box and having its smaller end arranged at the outlet and its larger end arranged beneath the safety twyer to catch discharge therefrom, substantially as described.

2. A cupola wind box having in its floor a safety outlet provided with a fusible or destructible closure, a detachable funnel like box projecting upward from the outlet and above the closure and floor, a swinging ring cover carrying said closure and adapted to afford access to the box, and a catch for the cover, substantially as described.

In testimony whereof I have hereunto signed my name.

NEWBOLD ETTING.

Witnesses:
WM. J. JACKSON,
FRANK E. FRENCH.